Oct. 9, 1934.  R. E. FISHER  1,975,931
RAILWAY VEHICLE WHEEL
Filed May 27, 1932  2 Sheets-Sheet 1
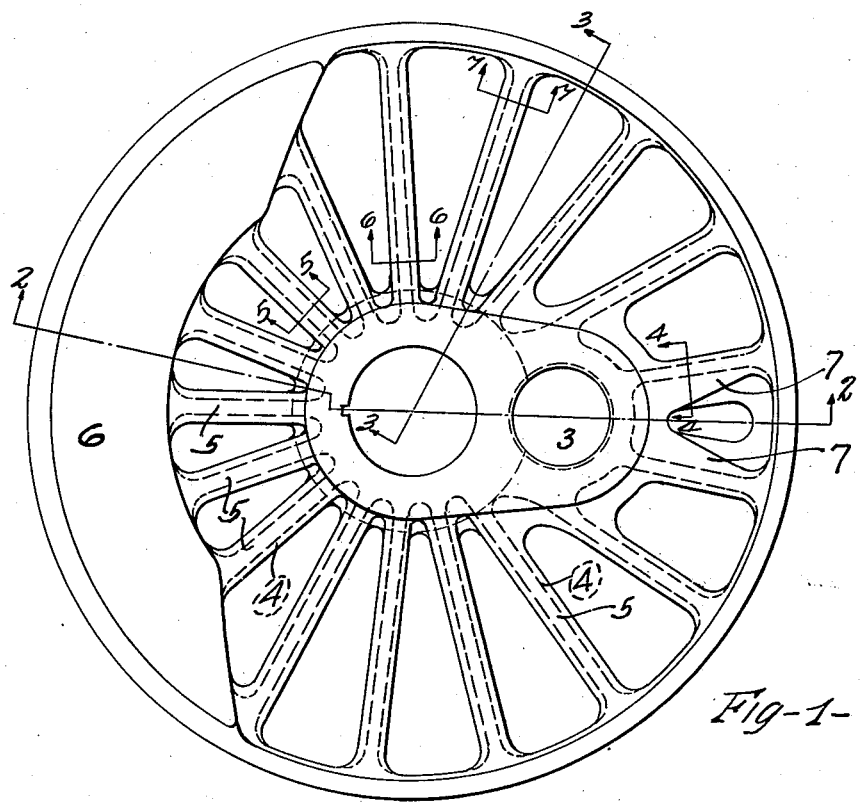
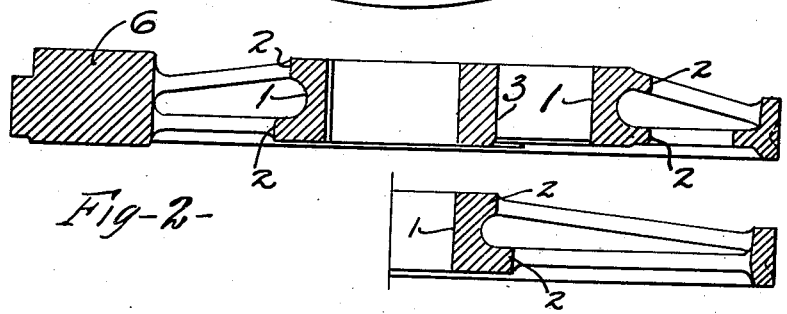
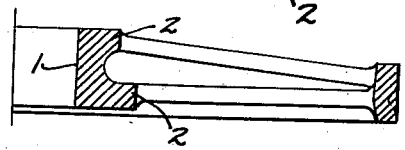
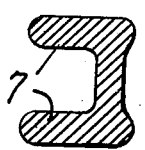
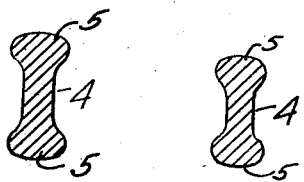
Inventor
Raymond E. Fisher
By
Rodney Bedell
Attorney Oct. 9, 1934. R. E. FISHER 1,975,931
RAILWAY VEHICLE WHEEL
Filed May 27, 1932 2 Sheets-Sheet 2
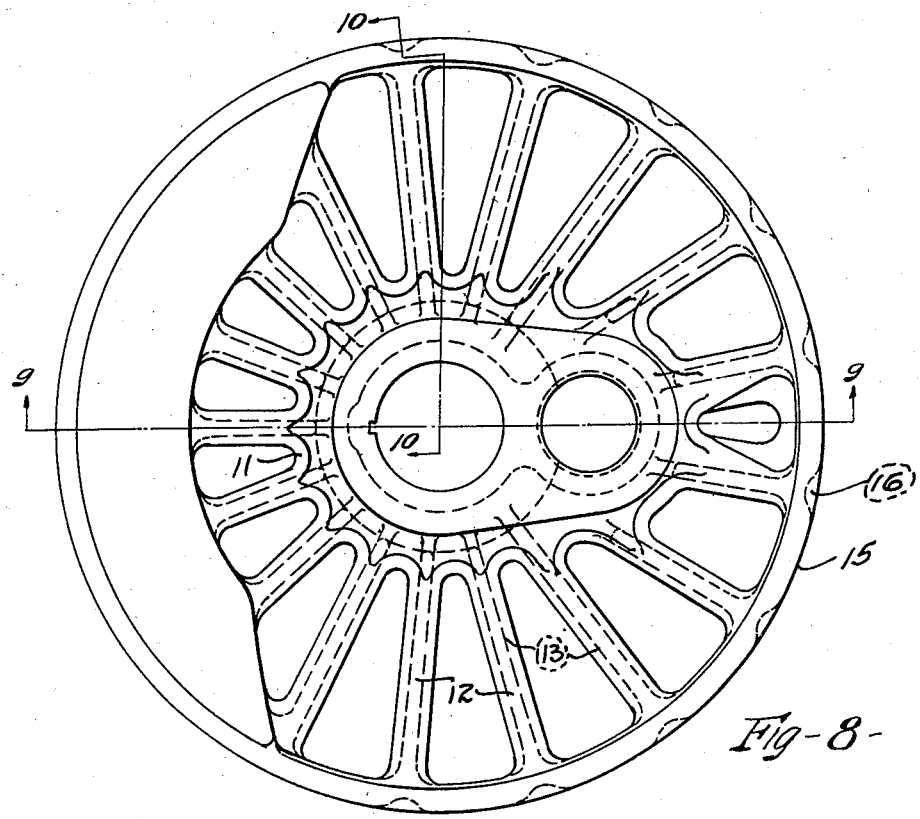
Fig-8-
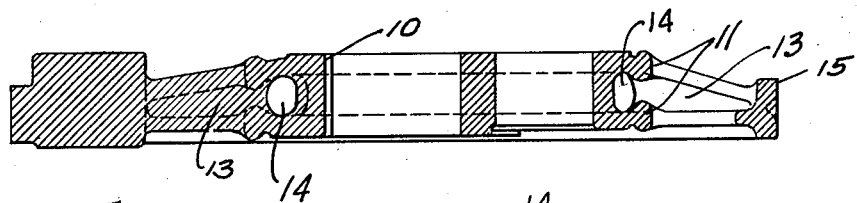
Fig-9-
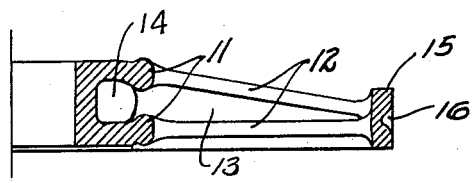
Fig-10-
Inventor
Raymond E. Fisher
By
Rodney Bedell
Attorney Patented Oct. 9, 1934

1,975,931

UNITED STATES PATENT OFFICE 1,975,931

RAILWAY VEHICLE WHEEL

Raymond E. Fisher, Prospect Park, Pa., assignor to General Steel Castings Corporation, Granite City, Ill., a corporation of Delaware Application May 27, 1932, Serial No. 613,794

11 Claims. (Cl. 295—6)

The invention relates primarily to railway locomotive driving wheels although features of the invention may be used in wheels for other vehicles, and the invention consists in novel construction of a cast metal wheel center which may include the tire or to which a tire of different material may be applied. As is well known in the art, such a wheel center includes a mass of material at the hub, the crank pin journal, and at the counter balance, in combination with the use of relatively light spokes which tie these heavy masses to each other and to a relatively light rim. The production of such a structure in cast metal involves problems arising from the flow of metal in the mold, unequal shrinkage of the various parts upon cooling of the metal, and the resistance to stresses created in the operation of the wheels under heavy loads and at high speeds.

The main object of the present invention is to simplify and reduce the cost of producing a wheel of this type, and to reduce or eliminate the likelihood of defects resulting from the casting of wheel centers.

This object is attained by the novel shaping of the various parts and the manner of their connection with each other as described below and as illustrated in the accompanying drawings, in which—

Figure 1 is a side elevation of one form of the invention.

Figures 2 to 7 are transverse sections taken on the corresponding section lines of Figure 1.

Figure 8 is a side view of another form of the invention.

Figures 9 and 10 are transverse sections on the corresponding section lines of Figure 8.

The hub of the wheel shown in Figures 1 to 7 has a radial section that is of channel shape including a web 1 and flanges 2. This section is continued about the crank pin bearing 3. The spokes projecting outwardly from the hub and crank pin bearing are preferably of dumb-bell cross section, each spoke comprising a web 4 with bulbous edges 5. The spoke webs 4 merge with the hub web 1 and the bulbous edges 5 of the spokes merge with the edges of the hub flanges 2.

The counter balance 6 is disposed diametrically opposite the crank pin bearing 3 and the edges 7 of the spokes directly opposite the counter balance are of much larger section than the edges of the remaining spokes whereby the same better withstands the distorting tendency resulting from shrinkage of the large mass of the metal in the counter balance.

In the construction shown in Figures 8 to 10, the hub 10 is of deeper channel section than in the wheel of Figures 1 to 7, and the edges 11 of the hub channel are bulbous and of greater thickness than the bulbous edges 12 of the spokes. Preferably, the webs 13 of the spokes terminate at points spaced from the hub web, leaving an opening 14 to accommodate shrinkage stresses. The rim 15 is provided with recesses 16 at the ends of the spokes to reduce the mass of material at these points.

In both forms of the invention the webs of the spokes are deeper at the hub than at their ends where they merge with the rim of the wheel center.

The shaping of the hub and spoke sections as illustrated simplifies the core and molding work and facilitates the flow of metal during the pouring of the casting. This shaping also provides a maximum amount of strength for the material used and the wheel is well braced normal to its plane. The arrangement provides adequate strength without excess material and all of these advantages may be retained notwithstanding variations in the details of the structure, and I contemplate the exclusive use of those features of the invention which come within the scope of my claims.

What is claimed is:

1. A vehicle wheel center including a hub having a radial section of channel shape, and spokes each having a web-like intermediate part and enlarged bulbous edges, said edges merging with the flanges of the hub channel.

2. A vehicle wheel center including a hub of channel cross section with its web at the inner periphery and its flanges extending outwardly therefrom with the edges enlarged to bulb form, there being spokes merging with and radiating from both flanges of the hub.

3. A wheel center as specified in claim 2 which also includes spokes of dumb-bell cross section with their edges merging with the edges of said hub flanges.

4. A wheel center as specified in claim 2 which also includes spokes of dumb-bell cross section with their edges merging with the edges of said hub flanges and with their webs disposed transversely of the plane of the wheel center, the inner ends of said spoke webs being spaced from the web of the hub channel.

5. In a locomotive driving wheel center, a central mass comprising an axle hub and a driving pin bearing merged with each other, the entire annular periphery of said mass including radially extending flanges, and spoke elements extending radially from the outer edges of said flanges.

6. In a vehicle wheel center, a hub with spaced circular continuous flanges parallel to the plane of the wheel center and extending radially of the body of the hub, spokes having side elements merging with said flanges and having ribs between said elements but terminating short of the body of the hub to provide an uninterrupted annular channel between said flanges.

7. A vehicle wheel center having a hub with a channel cross section, the flanges of which extend radially of the hub, and spokes of dumb-bell cross section with their edges merging with the hub channel flanges and with their webs terminating at a point spaced from the hub channel web.

8. A vehicle wheel center cast structure including spokes, each comprising a relatively thin web-like intermediate part and edges enlarged to bulbous form for molding and strengthening purposes.

9. A vehicle wheel center cast structure including a hub of channel section with the edges of its flanges enlarged for molding and strengthening purposes, and spokes radiating from said enlarged edges.

10. A vehicle wheel center cast structure including a hub having rib-like parts in different planes paralleling the general plane of the wheel center, the edges of said parts being enlarged for molding and strengthening purposes, and ribs radiating from said parts.

11. A wheel center structure including a hub having a channel periphery with radial flanges, and spokes each comprising a web-like central part terminating at a point spaced from the web portion of said hub periphery and enlarged edges merging with said hub flanges.

RAYMOND E. FISHER.